(12) United States Patent  
Somes

(10) Patent No.: US 8,339,273 B2  
(45) Date of Patent: Dec. 25, 2012

(54) EVENT ENUNCIATOR FOR A POWER LINE USING A LANYARD

(75) Inventor: Corydon L. Somes, Davenport, FL (US)

(73) Assignee: Southwire Company, Carrollton, GA (US)

( * ) Notice: Subject to any disclaimer, the term of this patent is extended or adjusted under 35 U.S.C. 154(b) by 504 days.

(21) Appl. No.: 12/704,218

(22) Filed: Feb. 11, 2010

(65) Prior Publication Data

US 2011/0193698 A1    Aug. 11, 2011

(51) Int. Cl.
   *G08B 21/00*    (2006.01)
(52) U.S. Cl. .................... 340/686.1; 340/540; 174/40 R
(58) Field of Classification Search ............... 340/686.1, 340/687, 540; 174/40 R–45 R
   See application file for complete search history.

(56) References Cited

U.S. PATENT DOCUMENTS

2009/0103224 A1    4/2009    Holsomback ............. 340/686.1

*Primary Examiner* — Jeffery Hofsass  
(74) *Attorney, Agent, or Firm* — Merchant & Gould

(57) ABSTRACT

An event annunciator may be provided. The event annunciator may comprise a housing, an alerting element, a switch, and a lanyard. The housing may be configured to mount on a pole that supports an electric power line. The alerting element may be in the housing and may have an active state and an inactive state. The switch may be in the housing and may have a first position and a second position. The first position may cause the alerting element to remain in the inactive state. The second position may cause the alerting element to remain in the active state. The lanyard may be configured to cause the switch to operate from the first state to the second state when the lanyard is pulled from the housing.

20 Claims, 8 Drawing Sheets

EVENT ENUNCIATOR FOR A POWER LINE USING A LANYARD

COPYRIGHTS

All rights, including copyrights, in the material included herein are vested in and the property of the Applicants. The Applicants retain and reserve all rights in the material included herein, and grant permission to reproduce the material only in connection with reproduction of the granted patent and for no other purpose.

BACKGROUND

Electricity distribution is the final stage in power delivery to end users. A distribution system's network carries electricity from a transmission system and delivers it to consumers. A distribution system begins as a primary circuit leaves a substation and ends as a secondary service enters a customer's meter. A variety of processes, materials, and equipment, including covered spacer cable power lines, are used by various utility companies to deliver electrical power.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

An event annunciator may be provided. The event annunciator may comprise a housing, an alerting element, a switch, and a lanyard. The housing may be configured to mount on a pole that supports an electric power line. The alerting element may be in the housing and may have an active state and an inactive state. The switch may be in the housing and may have a first position and a second position. The first position may cause the alerting element to remain in the inactive state. The second position may cause the alerting element to remain in the active state. The lanyard may be configured to cause the switch to operate from the first state to the second state when the lanyard is pulled from the housing.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
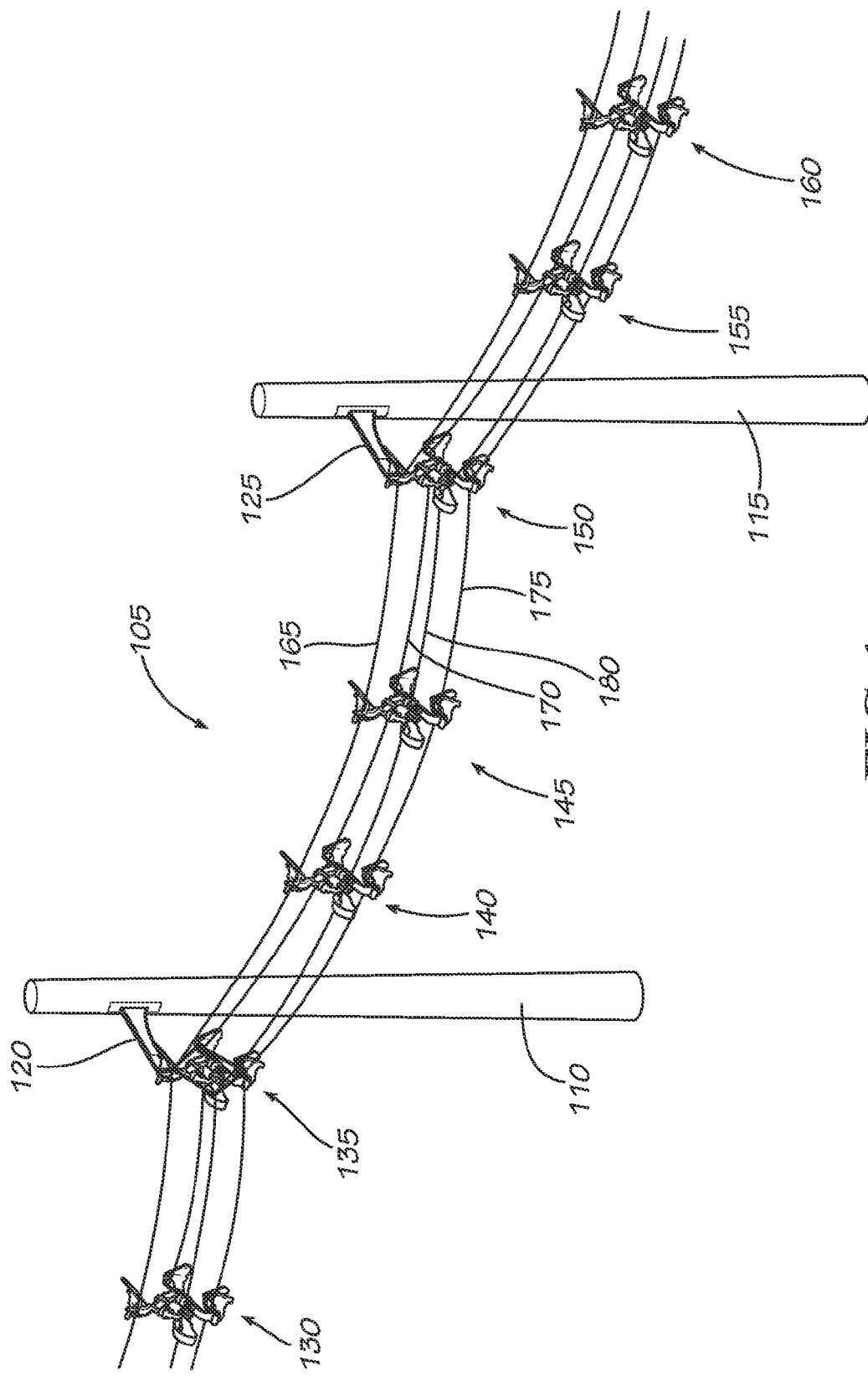
FIG. 1 shows an operating environment for a covered spacer cable power line.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Utility companies use power lines to distribute electrical power. One power line type constriction is a covered spacer cable power line. Covered spacer cable power lines are supported by a series of brackets, a series of poles, and a messenger supported by the series of poles. During the covered spacer cable power line's operation, events occur, for example, the messenger breaking, one of the brackets breaking, a pole top breaking, or the covered spacer cable power line becoming displaced in some way. Should an event occur, the energized covered spacer cable power line may sag so that it may be in a position to be contacted by a person on the ground.

Consistent with embodiments of the invention, an event annunciator may be provided that activates if an event occurs. An active event annunciator may allow the utility that operates the covered spacer cable power line to quickly locate the event. Once the event is located using the event annunciator, the utility may be able to perform repairs more quickly than if the utility relied on identifying the event in conventional ways. Furthermore, the event annunciator may warn persons on the ground that an event has occurred. Consequently, the public's attention may be drawn to the event so that they will report the event and be warned to avoid any hazards that may be present as a result of the event. Events may be caused by anything including, but not limited to, bad weather, ice build-up, high winds, faulty material, or even equipment or vehicles impacting a covered spacer cable power line and/or poles.

FIG. 1 shows an operating environment 100 for a covered spacer cable power line 105. As shown in FIG. 1, covered spacer cable power line 105 may be supported by a first pole 110 and a second pole 115. A first hanger arm 120 on first pole 110 may support covered spacer cable power line 105, which may be suspended from first hanger arm 120. Similarly, a second hanger arm 125 on second pole 115 may support covered spacer cable power line 105, which may be suspended from second hanger arm 125.

Covered spacer cable power line 105 may comprise a plurality of spacers. As shown in FIG. 1, covered spacer cable power line 105 may comprise a first spacer 130, a second spacer 135, a third spacer 140, a fourth spacer 145, a fifth spacer 150, a sixth spacer 155, and a seventh spacer 160. While operating environment 100 shows seven spacer, any number of spacers may be used.

The plurality of spacers may each include a spacer body having four concave seats. One of the concave seats may be downwardly oriented and configured to receive a messenger cable 165. Three of the concave seats may be upwardly oriented and configured to respectively receive three power conductors comprising a first conductor 170, a second conductor 175, and a third conductor 180. The plurality of spacers may hold first conductor 170, second conductor 175, and third conductor 180 in a certain configuration, for example, holding first conductor 170, second conductor 175, and third conductor 180 in approximate location relative to each other.

First conductor 170, second conductor 175, and third conductor 180 may be covered by a material. While the aforementioned conductors may be covered by a material, the conductors may not be considered insulated taking into consideration the voltage at which covered spacer cable power line 105 is operated. In other words, while the conductors may be covered, the covering may not be sufficient to classify the conductors as insulated according to an applicable electrical safety code for the operating voltage of covered spacer cable power line 105. First conductor 170, second conductor 175, and third conductor 180 may be made, for example, of copper or aluminum alloy and may be stranded or solid. Messenger cable 165 may comprise a stranded conductor comprising aluminum or aluminum alloy strands stranded around a high strength stranded core comprising metal alloy such as high strength steel (HSS). Messenger cable 165 may serve as a strength member and a neutral conductor for covered spacer cable power line 105.

First hanger arm 120 on first pole 110 may support second spacer 135 and messenger cable 165. Similarly, second hanger arm 125 on second pole 115 may support fifth spacer 150 and messenger cable 165. First spacer 130, third spacer 140, fourth spacer 145, sixth spacer 155, and seventh spacer 160 may be supported by messenger cable 165, which may be under horizontal tension. In other words first spacer 130, third spacer 140, fourth spacer 145, sixth spacer 155, and seventh spacer 160 may be suspended from messenger cable 165.

Figure 2:
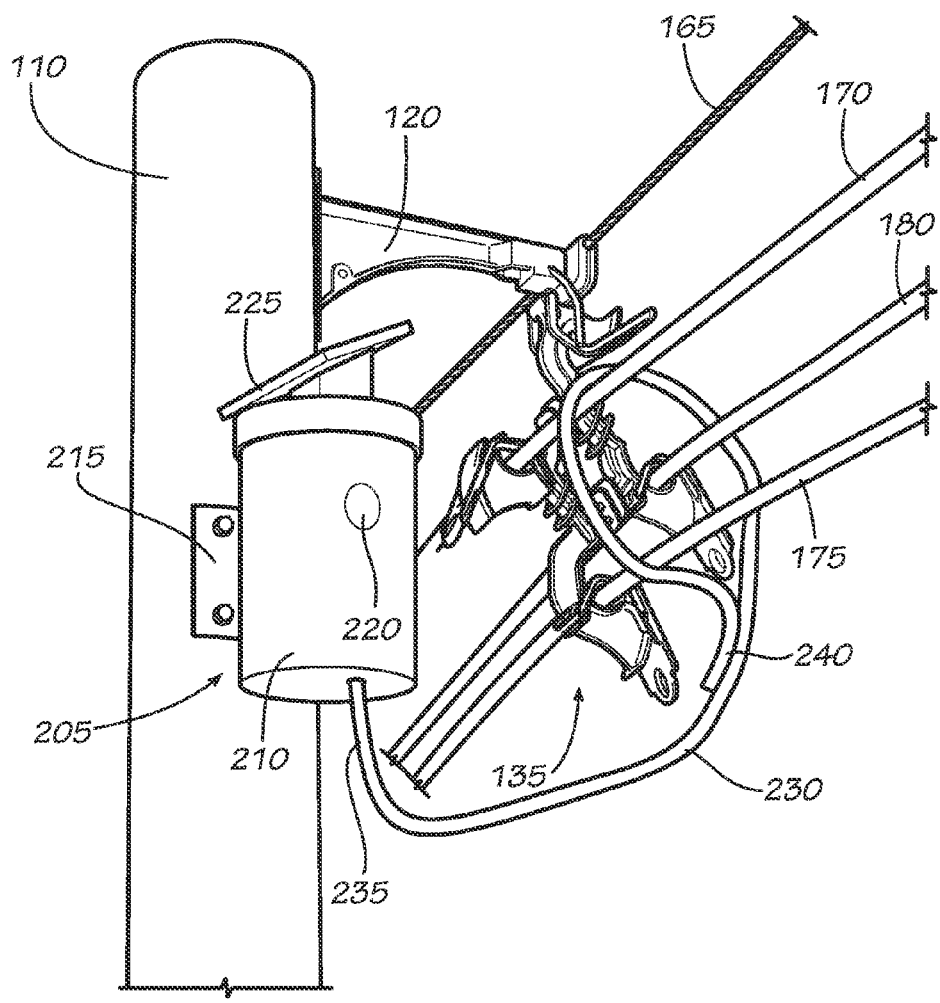
FIG. 2 shows an event annunciator operating environment.

FIG. 2 shows an event annunciator operating environment 200. As shown in FIG. 2, first pole 110 may have an event annunciator 205 attached to it. Event annunciator 205 may comprise a housing 210 being attached to first pole 110 using a bracket 215. Event annunciator 205 may be attached to first pole 110 above first hanger arm 120, below first hanger arm 120, or at a level on first pole 110 substantially even with first hanger arm 120.

Event annunciator 205 may include an alerting element 220. Alerting element 220 may comprise, but is not limited to, a high intensity strobe light or a device configured to create a human-perceivable noise. Notwithstanding, alerting element 220 may comprise any element capable of creating an alert. Alerting element 220 may have an active state and an inactive state. For example, when alerting element 220 comprises a high intensity strobe light, the active state may be the high intensity strobe light flashing, while the inactive state may be the high intensity strobe light being off. Furthermore, when alerting element 220 comprises a device configured to create a human-perceivable noise, the active state may be the device making a human-perceivable noise, while the inactive state may be the device being silent.

Figure 8A:
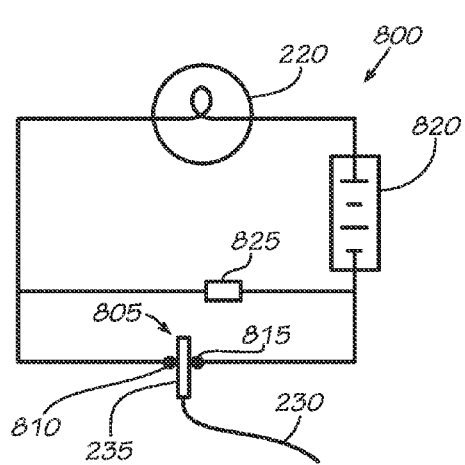
FIG. 8A shows an electrical circuit.
Figure 8B:
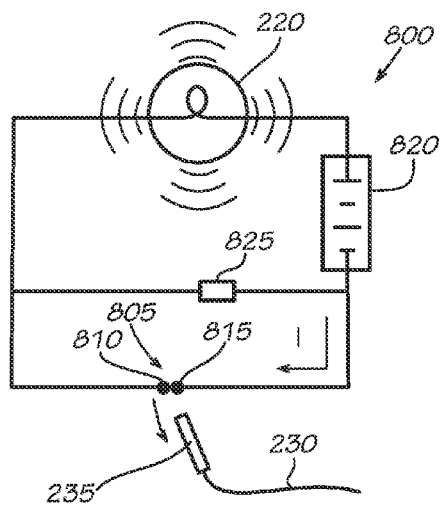
FIG. 8B shows an electrical circuit.
Figure 8C:
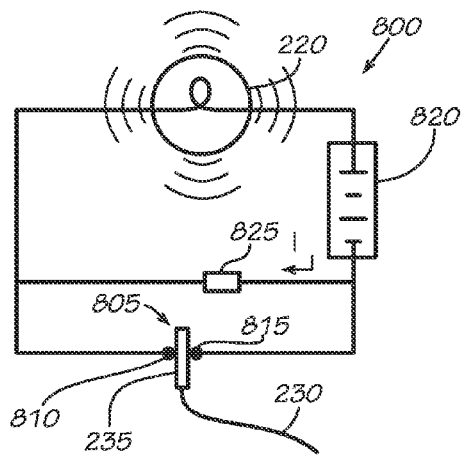
FIG. 8C shows an electrical circuit.

Event annunciator 205 may comprise a power source such as a solar cell 225 or a battery 820 as described in greater detail below with respect to FIGS. 8A and 8B. The power source comprising solar cell 225, for example, may recharge battery 820 powering event annunciator 205. The power source may also comprise a current transformer (CT) (not shown) or potential transformer (PT) (not shown) configured to scavenge power off of covered spacer cable power line 105. Notwithstanding, the power source may comprise any element capable of providing power to event annunciator 205 or charging a battery within event annunciator 205.

Moreover, event annunciator 205 may comprise a switch located within housing 210. The switch may have a first position and a second position. The first position may cause alerting element 220 to remain in the inactive state while the second position may cause alerting element 220 to remain in the active state.

A lanyard 230 may extend from housing 210. Lanyard 230 may have a first end 235 and a second end 240. Second end 240 may encircle covered spacer cable power line 105. The aforementioned switch may comprise a first spring-loaded contact being separated from a second spring-loaded contact by first end 235 of lanyard 230 when lanyard 230 is connected to housing 210. The switch may be in the first position when the first spring-loaded contact is separated from the second spring-loaded contact by first end 235 of lanyard 230. However, when first end 235 of lanyard 230 is pulled away from housing 210, the switch may operate from the first position to the second position because the first spring-loaded contact and the second spring-loaded may contact electrically and connect. Consequently, alerting element 220 may switch from the inactive state to the active state.

Figure 3:
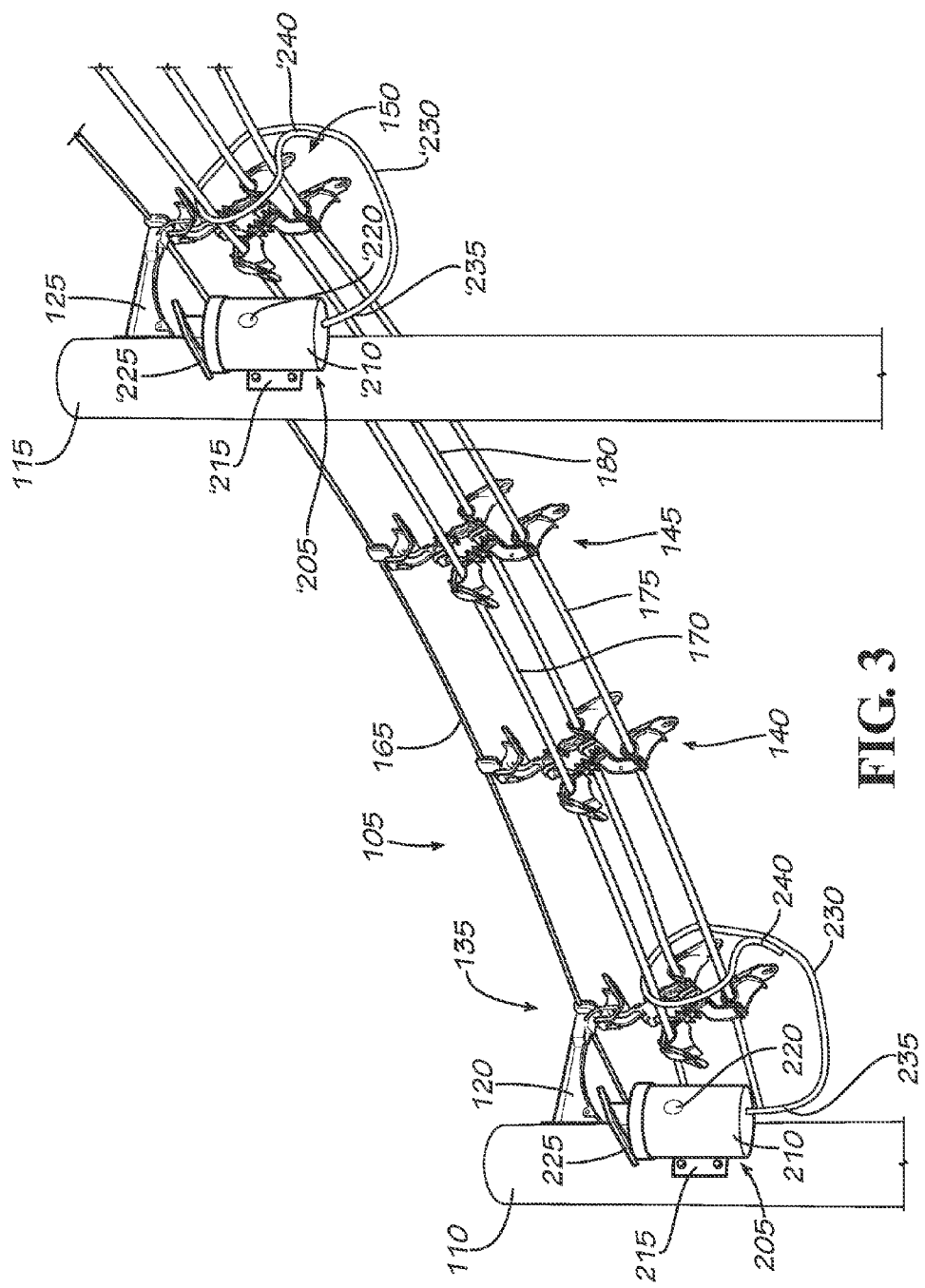
FIG. 3 shows a covered spacer cable power line with an event annunciator.

FIG. 3 shows operating environment 100 of FIG. 1 including event annunciator 205 of FIG. 2. As shown in FIG. 3, second pole 115 may have an another event annunciator '205 attached to it. Another event annunciator '205 may comprise another housing '210 being attached to second pole 115 using an another bracket '215. Another event annunciator '205 may include an another alerting element '220, an another solar cell '225, and an another lanyard '230. Another event annunciator '205 may operate in a manner similar to event annunciator 205.

Figure 4:
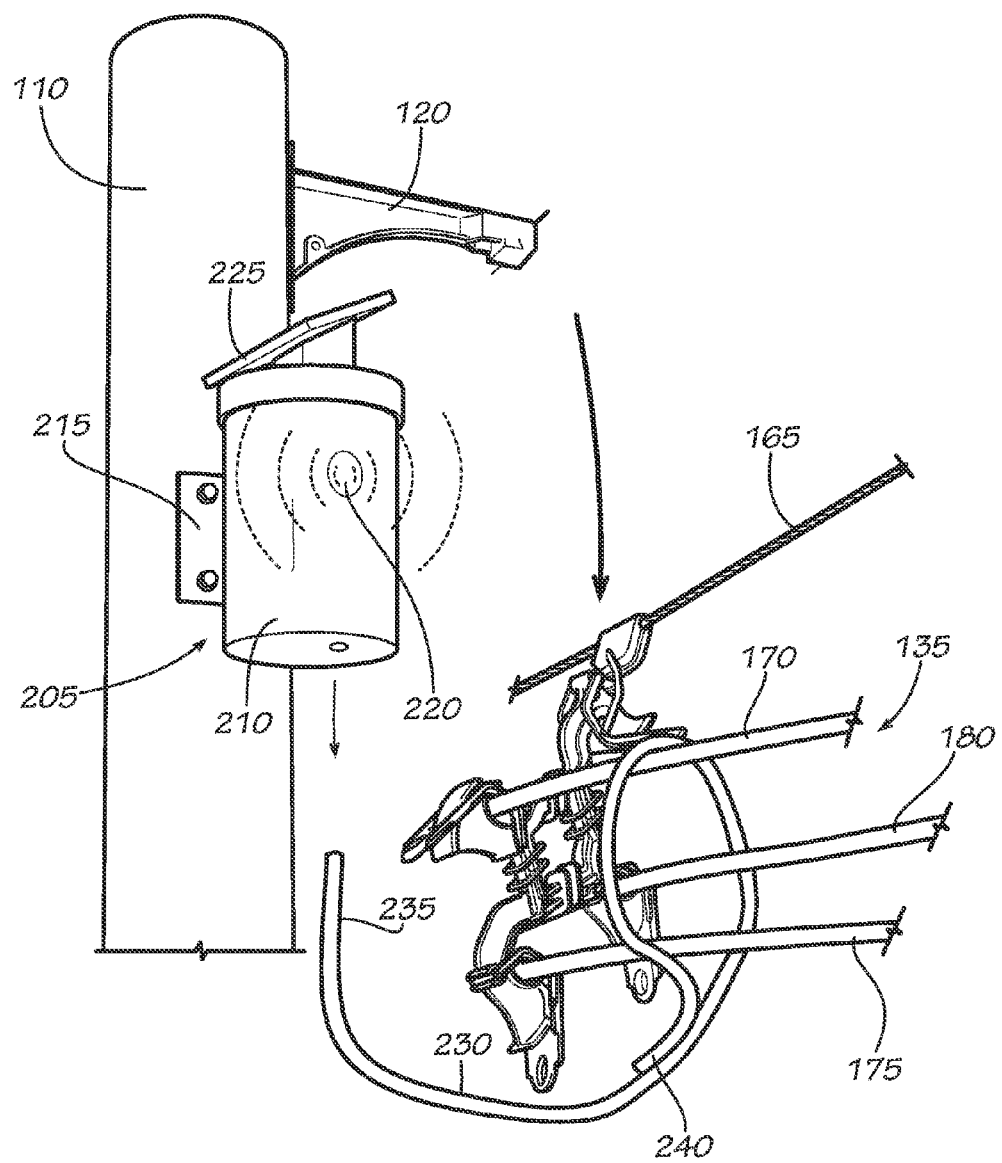
FIG. 4 shows an event annunciator operating environment.
Figure 5:
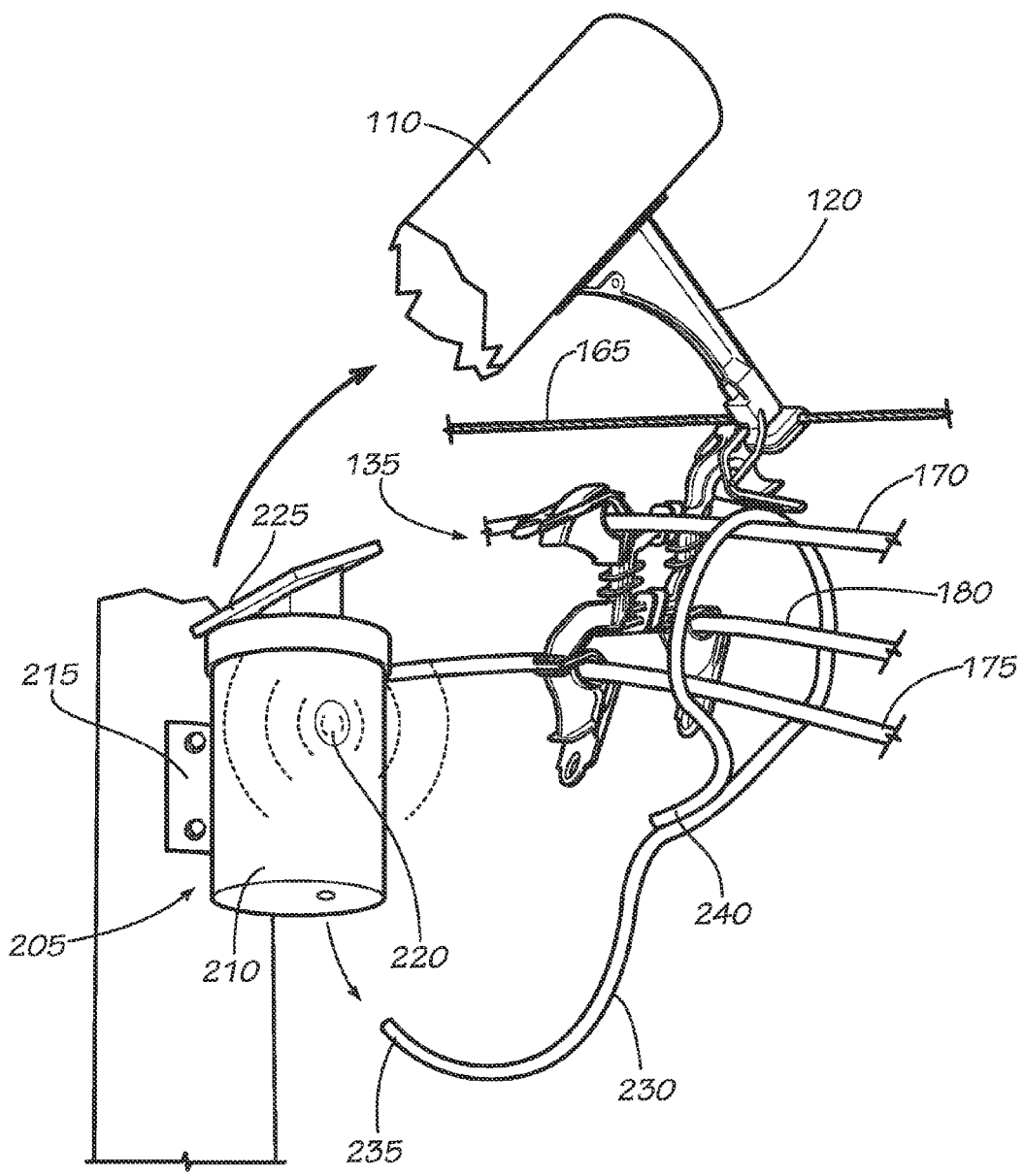
FIG. 5 shows another event annunciator operating environment.
Figure 6:
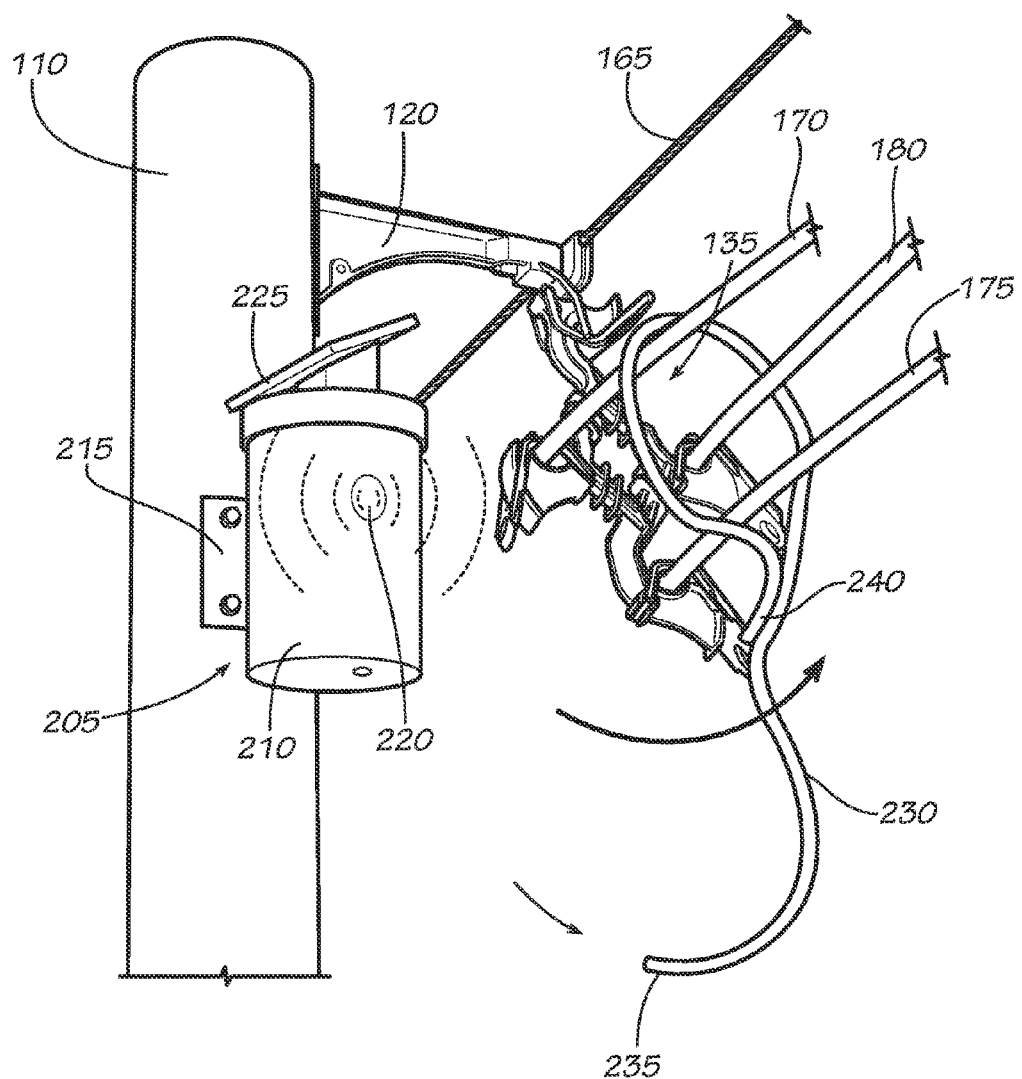
FIG. 6 shows yet another event annunciator operating environment.

As shown in FIG. 4, FIG. 5, and FIG. 6, a number of events may occur for which it may be desired for event annunciator 205 to operate from the inactive state to the active state. For example, as show in FIG. 4, one alertable event may comprise second spacer 135 and/or messenger cable 165 breaking away from first hanger arm 120. Because second end 240 of lanyard 230 may be wrapped around and attached back to lanyard 230 (thus encircling covered spacer cable power line 105), when second spacer 135 and/or messenger cable 165 breaks away from first hanger arm 120, first end 235 of lanyard 230 may pull away from housing 210. Consequently, alerting element 220 may switch from the inactive state to the active state as described above with respect to FIG. 2. Consistent with embodiments of the invention, second end 240 of lanyard 230 may encircling any one of more of first conductor 170, second conductor 175, third conductor 180, and messenger cable 165. Furthermore, lanyard 230 may be attached to second spacer 135. Notwithstanding, lanyard 230 may be configured in any way in which it would be caused to pull out of housing 210 as a result of second spacer 135 and/or messenger cable 165 breaking away from first hanger arm 120.

Moreover, as shown in FIG. 5, another alertable event may comprise the top of first pole 110 breaking away from the rest of first pole 110. Consistent with embodiments of the invention, event annunciator 205 may be attached to first pole 110 below first hanger arm 120. Because second end 240 of lanyard 230 may be wrapped around and attached back to lanyard 230 (thus encircling covered spacer cable power line 105), when the top of first pole 110 breaks away from the rest of first pole 110, first end 235 of lanyard 230 may pull away from housing 210. Consequently, alerting element 220 may switch from the inactive state to the active state as described above with respect to FIG. 2. Consistent with embodiments of the invention, second end 240 of lanyard 230 may encircling any one of more of first conductor 170, second conductor 175, third conductor 180, and messenger cable 165. Furthermore, lanyard 230 may be attached to second spacer 135, first hanger arm 120, or the top of first pole 110. Notwithstanding, lanyard 230 may be configured in any way in which it would be caused to pull out of housing 210 as a result of the top of first pole 110 breaking away from the rest of first pole 110.

Furthermore, as show in FIG. 6, another alertable event may comprise covered spacer cable power line 105 swinging away from first pole 110. Because second end 240 of lanyard 230 may be wrapped around and attached back to lanyard 230 (thus encircling covered spacer cable power line 105), when covered spacer cable power line 105 swinging away from first pole 110, first end 235 of lanyard 230 may pull away from housing 210. Consequently, alerting element 220 may switch from the inactive state to the active state as described above with respect to FIG. 2. Consistent with embodiments of the invention, second end 240 of lanyard 230 may encircling any one of more of first conductor 170, second conductor 175, third conductor 180, and messenger cable 165. Furthermore, lanyard 230 may be attached to second spacer 135. Notwithstanding, lanyard 230 may be configured in any way in which it would be caused to pull out of housing 210 as a result of covered spacer cable power line 105 swinging away from first pole 110.

Figure 7:
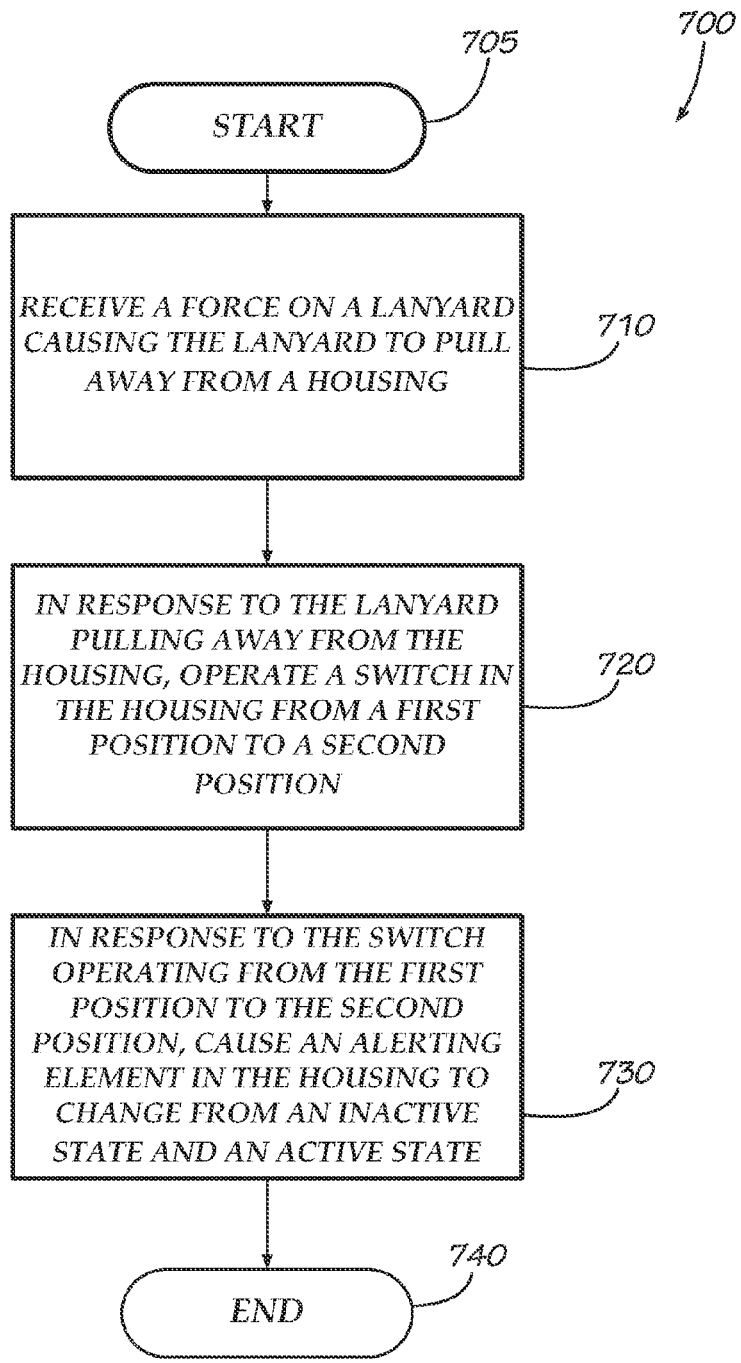
FIG. 7 is a flow chart of a method for providing event annunciation.

FIG. 7 is a flow chart setting forth the general stages involved in a method 700 consistent with an embodiment of the invention for providing event annunciation. Method 700 may be implemented using event annunciator 205 as described in more detail above. Ways to implement the stages of method 700 will be described in greater detail below.

Method 700 may begin at starting block 705 and proceed to stage 710 where a force may be received on lanyard 230 causing lanyard 230 to pull away from housing 210 of event annunciator 205. The force may result from covered spacer cable power line 105 being displaced. For example, the force may result from an event occurring on covered spacer cable power line 105. Events may be caused by anything including but not limited to, bad weather, ice build-up, high winds, faulting material, or even equipment or vehicles impacting a covered spacer cable power line and/or poles. Described above with respect to FIG. 4, FIG. 5, and FIG. 6, are examples of how the force may result from covered spacer cable power line 207 being displaced.

From stage 710, where lanyard 230 pulls away from housing 210 of event annunciator 205, method 700 may advance to stage 720 where a switch may operate in housing 210 from a first position to a second position. For example, as shown in FIG. 8A, a circuit 800 may reside in housing 210. Circuit 800 may include a switch 805. Switch 805 may have a first position and a second position. The first position may cause alerting element 220 to remain in the inactive state while the second position may cause alerting element 220 to remain in the active state. Switch 805 may comprise a first spring-loaded contact 810 being separated from a second spring-loaded contact 815 by first end 235 of lanyard 230 when lanyard 230 is connected to housing 210 as shown in FIG. 8A. Switch 805 may be in the first position when first spring-loaded contact 810 is separated from second spring-loaded contact 815 by first end 235 of lanyard 230. However, when first end 235 of lanyard 230 is pulled away from housing 210, switch 805 may operate from the first position to the second position when first spring-loaded contact 810 and second spring-loaded contact 815 electrically connect.

Once switch 805 operates in stage 720, method 700 may continue to stage 730 where alerting element 220 in event annunciator 205 may change from an inactive state and an active state. For example, as stated above, switch 805 may operate from the first position to the second position when first spring-loaded contact 810 and second spring-loaded contact 815 electrically connect. FIG. 8B shows circuit 800 with switch 805 closed. Consequently, alerting element 220 may switch from the inactive state to the active state in FIG. 8B as a result of switch 805 closing and supplying current I from battery 820 to alerting element 220. After alerting element 220 changes from the inactive state and the active state in stage 730, method 700 may then end at stage 740.

Consistent with embodiments of the present invention, event annunciator 205 may include a position switch 825 configured to cause alerting element 220 to switch from the inactive state to the active state when housing 210 is moved from its normal position. Position switch 825 may allow the flow of current I from battery 820 to alerting element 220 in a manner that is dependent on position switch 825's physical position or alignment relative to the direction of the "pull" of earth's gravity, or other inertia. Position switch 825 may comprise, but is not limited to, an accelerometer, and may comprise a solid state electronic device. Because position switch 825 may be installed in such a way that position switch 825's movement and housing 210's movement are congruent, alerting element 220 may switch from the inactive state to the active state when housing 210 is moved from its normal position.

Housing 210 may be moved from its normal position when first pole 110 or a portion of first pole 110 is no longer substantially perpendicular to the earth's horizon. Examples of housing 210 moving from its normal position may comprise, but are not limited to, first pole 110 breaking off below bracket 215 or first pole 110 leaning or bending, but not breaking. Furthermore, housing 210 moving from its normal position may comprise first pole 110 being "bumped" in such a way that it moves, but returns substantially to its position before being bumped.

While certain embodiments of the invention have been described, other embodiments may exist. Further, the disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. An event annunciator comprising:
   a housing configured to mount on a pole supporting an electric power line;
   an alerting element in the housing having an active state and an inactive state;
   a switch in the housing having a first position and a second position wherein the first position causes the alerting element to remain in the inactive state and the second position causes the alerting element to remain in the active state; and
   a lanyard configured to cause the switch to operate from the first state to the second state when the lanyard is pulled from the housing due to the electric power line being displaced.

2. The event annunciator of claim 1, wherein the housing comprises a bracket configured to mount to the pole.

3. The event annunciator of claim 1, wherein the housing is mounted on the pole at a position horizontally around the pole that is approximately 90 degrees from a hanger arm supporting the electric power line comprising a covered spacer cable power line.

4. The event annunciator of claim 1, wherein the housing is mounted on the pole at a vertical level on the pole substantially even with a hanger arm supporting the electric power line comprising a covered spacer cable power line.

5. The event annunciator of claim 1, wherein the housing is mounted on the pole at a vertical level on the pole below a hanger arm supporting the electric power line comprising a covered spacer cable power line.

6. The event annunciator of claim 1, wherein the alerting element comprises a high intensity strobe light.

7. The event annunciator of claim 1, wherein the alerting element comprises a device configured to create a human-perceivable noise.

8. The event annunciator of claim 1, wherein the alerting element is powered by a battery inside the housing.

9. The event annunciator of claim 8, wherein the battery is charged by a solar cell.

10. The event annunciator of claim 8, wherein the battery is charged by a solar cell mounted on a top of the housing.

11. The event annunciator of claim 1, wherein the switch comprises a first spring-loaded contact and a second spring-loaded contact.

12. The event annunciator of claim 1, wherein the switch comprises a first spring-loaded contact being separated from a second spring-loaded contact by a first end of the lanyard when the lanyard is connected to the housing, the switch being in the first position when the first spring-loaded contact is separated from the second spring-loaded contact by the first end of the lanyard.

13. The event annunciator of claim 1, wherein the switch comprises a first spring-loaded contact and a second spring-loaded contact, the first spring-loaded contact and the second spring-loaded contact being configured to electrically connect when a first end of the lanyard is pulled away from the housing, the switch being configured to operate from the first position to the second position when first spring-loaded contact and the second spring-loaded contact electrically connect.

14. The event annunciator of claim 1, wherein the lanyard comprises a second end encircling the electric power line.

15. The event annunciator of claim 1, wherein the lanyard comprises a second end encircling the electric power line comprising a covered spacer cable power line.

16. The event annunciator of claim 1, wherein the lanyard comprises a second end encircling at least one conductor of the electric power line comprising a three-phase covered spacer cable power line.

17. The event annunciator of claim 1, wherein the lanyard comprises a second end encircling a messenger of the electric power line comprising a three-phase covered spacer cable power line.

18. The event annunciator of claim 1, wherein the lanyard comprises a second end connected to a hanger arm supporting the electric power line.

19. An event annunciator comprising:
a housing configured to mount on a pole supporting an electric power line comprising a three-phase covered spacer cable power line, the housing having a bracket configured to mount on the pole, the housing being mounted on the pole at a position horizontally around the pole that is approximately 90 degrees from a hanger arm supporting the electric power line;
an alerting element in the housing having an active state and an inactive state, the alerting element comprises a high intensity strobe light, the alerting element being power by a battery charged by a solar cell mounted on a top of the housing;
a switch in the housing having a first position and a second position wherein the first position causes the alerting element to remain in the inactive state and the second position causes the alerting element to remain in the active state; and
an electrically non-conductive lanyard configured to cause the switch to operate from the first position to the second position when the lanyard is pulled from the housing, wherein the switch comprises a first spring-loaded contact being separated from a second spring-loaded contact by a first end of the lanyard when the lanyard is connected to the housing, the switch being in the first position when the first spring-loaded contact is separated from the second spring-loaded contact by the first end of the lanyard, the first spring-loaded contact and the second spring-loaded contact being configured to electrically connect when the first end of the lanyard is pulled away from the housing, the switch being configured to operate from the first position to the second position when first spring-loaded contact and the second spring-loaded contact electrically connect, the lanyard comprising a second end encircling at least one of the following: at least one conductor of the electric power line and a least one messenger of the electric power line.

20. A method for providing event annunciation, the method comprising:
receiving a force on a lanyard causing the lanyard to pull away from a housing, the force resulting from a covered spacer cable power line being displaced;
in response to the lanyard pulling away from the housing, operating a switch in the housing from a first position to a second position; and
in response to the switch operating from the first position to the second position, causing an alerting element in the housing to change from an inactive state and an active state.

* * * * *